(12) United States Patent
Usami

(10) Patent No.: US 6,588,672 B1
(45) Date of Patent: Jul. 8, 2003

(54) SEMICONDUCTOR DEVICE

(75) Inventor: Mitsuo Usami, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/463,626

(22) PCT Filed: Aug. 6, 1998

(86) PCT No.: PCT/JP98/03505
§ 371 (c)(1),
(2), (4) Date: Jan. 28, 2000

(87) PCT Pub. No.: WO99/08192
PCT Pub. Date: Feb. 18, 1999

(30) Foreign Application Priority Data

| Aug. 7, 1997 | (JP) | 9/212881 |
| Mar. 26, 1998 | (JP) | 10/078212 |

(51) Int. Cl.$^7$ ............................................. G06K 19/06
(52) U.S. Cl. ...................... 235/492; 235/379; 235/380
(58) Field of Search ................... 235/492, 379, 235/380

(56) References Cited

U.S. PATENT DOCUMENTS 5,992,754 A * 11/1999 Ito et al. .................... 235/441
6,076,737 A * 6/2000 Gogami et al. ............. 235/488
6,347,738 B1 * 2/2002 Crevelt et al. .............. 235/375

OTHER PUBLICATIONS

"Tamper Resistance—a cautionary" written by Ross Anderson, et al. 1998 pp2/18–18/18.

* cited by examiner

Primary Examiner—Karl D. Frech
Assistant Examiner—Allyson Sanders
(74) Attorney, Agent, or Firm—Antonelli, Terry, Stout & Kraus, LLP

(57) ABSTRACT

A semiconductor device is provided which effectively prevents forgery or alteration of IC cards or the like handling important information. Electrodes each having an unshaped irregular surface are provided, respectively, on the IC chip side and the substrate side. The electrodes are connected to each other, with the IC chip facing downward. Connection resistance is employed as a Key code by subjecting the capacitance between the electrodes to A/D conversion. This serves to prevent the duplication of IC cards or the like by employing the connection resistance having a random value as the key code of cryptograph.

32 Claims, 16 Drawing Sheets

(1) INQUIRY OF NAME
(2) RESPONSE OF NAME
(3) RANDOM NUMBER
(4) ENCRYPTED KEY CODE

SEMICONDUCTOR DEVICE

FIELD OF THE INVENTION

The present invention relates to a semiconductor device resistant to forgery and falsification. More particularly, the invention relates to IC cards.

BACKGROUND OF THE INVENTION

An example of conventional art of producing IC cards resistant to forgery and falsification has been disclosed in "Processing of the 2nd workshop on Electronic Commerce" (Oakland Calif., Nov. 18–20, 1996).

To prevent IC cards from being forged and falsified, the above art stores a unique key code which works as a key in the chip of each IC card. This key code is used as an identification number of a user who is charged for a received service (such as telephone toll, gaming toll, and communication toll). For example, this number is corresponding to a credit-card number. The system offering the service (credit bureau or grantor) draws the charge from the bank account of the customer having the ID number. This key code can also be used for check credit information of the customer.

If a violator reads this important key code stored in memory area of the chip of each IC card, the IC card may be easily duplicated or forged. There are two ways of transferring data between an IC card and a read/write unit (RWU): contact type (making the IC card in contact with the RWU to transfer data) and non-contact type (using a radio technology to transfer data between the IC card and the RWU). Independently of these ways, each IC card contains a memory area and an I/O area through which data is transferred between the IC card and the RWU. This I/O area contains a processor circuit which can perform complicated encryption processing.

The key code stored in the memory area of the IC chip cannot be free from being analyzed and read electrically, physically, or chemically because the key code has been electrically stored in a memory cell in the memory area. In other words, as the memory cell is electrically charged (with electrons) to store a key code, it can be read in a visible form (as a pattern), for example, by an electronic microscope of high resolution. The key code in the memory cell may also be read by a fine machining unit when the memory area and its vicinity are machined until their conductors are exposed and the exposed memory and nearby circuits are driven electrically.

To prevent such illegal reading of the key code, the conventional art employs a battery to back up the operation of the IC card. With this, if any electrical, physical, or chemical attack is made on the IC chip and consequently the battery power is shut down, the content of memory is lost.

For example, using a sensor to detect a destructive attack onto the chip or its vicinity in the IC card with a backup battery, one can create such a circuit to erase the content of the memory in cooperation with the output of the sensor. A static RAM (SRAM) can then be used as a memory cell to assure deletion of the content of memory when the IC card is decomposed and the power is shut off.

Further, a conventional method for creating a code resistant to forgery and falsification has been disclosed in Japanese Non-examined Patent Publication No. 59-10937 (1984). To assure protection of the code against forgery and falsification, this method comprises measuring the resonance frequency and the amplitude and the phase deviation of the returned wave, converting these into a corresponding value according to an algorithm to make the measured values undisclosed, combining this value with a secret identification number into a code, and storing the result.

This code number is permanently stored in the memory area of the IC chip.

The conventional art of protecting a code in respective IC cards against forgery and falsification requires a battery in each card. Provision of a battery in each IC card causes the following demerits: increase of production cost of IC-cards, the service life of the IC cards is limited by their battery lives, shock-sensitive cards (battery destruction or incomplete contact caused by shocks), and card thickness being limited by battery sizes.

Further, a conventional electrical method of creating a code, for example, a method of using characteristic dispersions of electric circuits, is not resistant enough to protect the code against forgery and falsification because the characteristic dispersion is very narrow, easily measured and duplicated, and the electric circuit is easily decomposed and decoded.

An object of the present invention is to provide an inexpensive and highly-reliable semiconductor device which is hard to be forged and falsified and a method of producing thereof.

SUMMARY OF THE INVENTION

The aforesaid object can be attained by giving one or more electrodes whose surfaces are rough (having irregular projections and dents) to both an IC chip and a card base, causing these electrodes to touch each other with the electrodes of the IC chip faced down, measuring the resistance of electrodes in connection, analog-to-digital converting the resistance, and using the result as the key code of the IC card.

The surfaces of electrodes easily change their roughness and resistance in connection when the electrodes in connection are separated. The electrodes cannot have the original resistances any more. Therefore, it is possible to check whether the IC card has been subject to a destructive attack.

Further, this object can be attained more effectively by giving one or more electrodes to both an IC chip and a card base, cementing these electrodes with an electroconductive adhesive material with the electrodes of the IC chip faced down, measuring the resistance of electrodes in connection, analog-to-digital converting the resistance, and using the result as the key code of the IC card.

This electroconductive adhesive material can make the contact resistance (which is an analog value) more unfixed and consequently make the contact resistance dispersion greater.

Furthermore, this object can be attained more effectively by giving one or more electrodes to both an IC chip and a card base, cementing these electrodes with an anisotropic electroconductive adhesive material containing fine conductive particles with the electrodes of the IC chip faced down, measuring the resistance of electrodes in connection, analog-to-digital converting the resistance, and using the result as the key code of the IC card.

Fine gold particles (5 $\mu$m to 10 $\mu$m in size) dispersed in the anisotropic electroconductive adhesive material can disperse the resistances between electrodes.

A greater effect in resistance dispersion can be obtained when the main ingredient of said electrodes is equal to that of the fine particles dispersed in the anisotropic electroconductive adhesive material.

This object can be attained by giving one or more electrodes whose surfaces are rough (having irregular projections and dents) to both an IC chip and a sheet, covering the IC chip with the sheet with their electrodes in contact, measuring the resistance of electrodes in connection, analog-to-digital converting the resistance, and using the result as the key code of the IC card.

In other words, this sheet coverage enables direct use of conventional processing of IC chips even when the IC cards are conventional faced-up cards, which can reduce the manufacturing cost of IC cards.

This object is attained more effectively by reading the A/D-converted code to the outside of the IC card, encrypting it, and writing the encrypted code back into the memory area in the IC chip of the IC card.

In other words, the IC card can be recognized as a certified IC card when an legally-converted code is written in the chip.

This object is attained more effectively by encrypting the A/D-converted code in the chip of the IC card, reading it to the outside of the IC card, encrypting it again, and writing the encrypted code back into the memory area in the IC chip of the IC card.

Namely, this encryption inside the chip can make the key code in the chip safer even when the data is read by a line monitor.

This object is attained more effectively by storing the key code of an IC card which was read by a read/write unit in a database together with a registration code. In other words, when the key code of an IC card which is put in actual use by system supporting is registered in the database of a system, it can be used safely in the certification system. The registration code can contain an ID number, a name, a password, a personal attribute data, a service history, a credit number, accounting information, and credit rank.

This object can be attained more effectively when the key code of the created IC card is used to protect the IC card against forgery and falsification.

Substantially a key code is expressed by the dispersion of contact resistances. Therefore, it rarely happens that two or more IC cards have an identical key code and it is very hard to prepare cards of the same content.

This object can be attained more effectively when the key code of the created IC card is used for mutual certification between the IC card and a read/write unit.

The key code in accordance with the present invention is very hard to be regenerated and consequently fit for mutual certification.

Further this object can be attained more effectively when the key code of the created IC card is used for mutual certification together with a password or personal physical characteristic code.

In other words, when the key code is stored together with data expressing the physical characteristic of the card owner in the IC card, the IC card becomes unique for the card owner and hard to be forged and falsified.

This object of the present invention is attained more effectively when the code is used together with a biological characteristic code (e.g. palm code, finger print code, smell code, face code, voice code, vein code, pupil code, or DNA code).

The use of a personal code due to the aforesaid biometrics can make personal identification more accurate and assured.

This object of the present invention is attained more effectively when the open key codes and common key codes are decoded by a host system instead of read/write units.

If codes are decoded by a plurality of closed read/write units, a malicious person (third party) may disassemble the read/write unit and read the encrypting system. To reduce such a risk, decoding of such codes should be managed by a very few host systems.

This object of the present invention is attained more effectively when the created key codes are used for personal identification, forgery check, and mutual certification between the IC card and the read/write unit on the used as electronic money.

When the identification of the key code of said IC code is complete and safe, said IC card can be applied to a charging system and the like and particularly said IC card can be used as electronic money.

This object of the present invention is attained more effectively when there are up to four levels of A/D conversion resolution.

Namely, if there are four or less resolution levels, the codes can be regenerated correctly even when contact resistances may change as the time goes by.

This object of the present invention is attained more effectively when the connection area of one set of electrodes is 15 microns or less.

A small, safe and inexpensive key code can be prepared by arranging electrode pads in a small array.

This object of the present invention is attained more effectively when the areas at which electrodes are connected each other are arranged in a matrix manner.

In other words, a compact connection array can be prepared.

This object of the present invention is attained more effectively when the created key code is used to identify an IC card in case two or more IC cards make simultaneous responses. Namely, as there rarely exist IC cards having an identical key code, the key codes can be used to identify the IC cards.

This object of the present invention is attained more effectively by excluding analog values in boundary areas when A/D-converting contact resistances of electrodes whose surfaces are rough (having irregular projections and dents) and connected each other between the IC chip and the card base with the IC chip faced down.

Values on the boundary between analog values and digital values in A-to-D conversion may fluctuate as the time goes by. To avoid such value fluctuation and increase accuracy of values, it is recommended to exclude values on such a boundary or changing the boundary values.

Further, to attain this object, the IC card in accordance with the present invention consists of a card base and a semiconductor chip which are faced to each other. The card base has a set of isolated electrodes which are one-to-one faced to a set of isolated electrodes of the semiconductor chip. The capacitance (resistance) of a space between each pair of facing electrodes is measured and converted into a value and used as a key code of the card.

In other words, the present invention converts the capacitance (resistance) of a space between each pair of isolated and facing electrodes into a numeric value and uses this value as the key code of the IC card. Said capacitance is random but specific to the card and encrypted according to the open key algorithm. Therefore, there is the least possibility that the IC card is forged or falsified by a malicious person.

Said semiconductor chip contains an amplifier. Said amplifier builds up an integrating circuit together with said capacitance and a preset resistor. Said capacitance is converted into a numeric value by A/D-converting a voltage value generated by this integrating circuit. It is needless to say that said resistance as well as the said amplifier are housed in said semiconductor chip in advance.

Said card base and said semiconductor chip respectively have a set of isolated electrodes which are one-to-one faced to the other set of isolated electrodes. The capacitance (resistance) of a space between each pair of facing electrodes is unique and random. Therefore, it is very hard to know a set of said random capacitances even when a malicious person manages to read one of said capacitances. This means that IC cards of the same capacitances are very hard to be duplicated, forged, and falsified.

Said random capacitances can be prepared, for example, by placing a dielectric film made of different kinds of dielectric materials or a plurality of dielectric films of different thicknesses between said isolated electrodes which are faced to each other or forming spaces of different sizes between said isolated electrodes which are faced to each other. Preparing said electrodes of different thicknesses is one of means for forming spaces of different sizes between said isolated electrodes which are faced to each other.

There are some other means to form random capacitances between electrodes. For example, a dielectric material made of dielectric particles of a single kind but of different sizes in diameter can be placed between said isolated but facing electrodes.

The present invention allows the use of one or more of BST ($BaSrTiO_3$), PZT, $CaTiO_3$, and $KHZPO_4$ films.

The IC card prepared in accordance with the present invention is certified as follows: First the read/write unit inquires the IC card equipped with a semiconductor chip containing a key code and a name area of the name of the card owner. The IC card returns the name of the card owner to the read/write unit. On receiving the response from the IC card, the read/write unit sends said name to the database for a key code. The read/write unit generates a open key code using a random number, sends it to said IC card. The IC card encrypts a random number which is randomly generated from said capacitance values and sends the result to the read/write unit. The read/write unit decodes the encrypted data coming from the IC card, compares it by the key code on said data base, and judges whether or not it is valid.

As explained above, the key code is created according to random capacitance values and encrypted by the IC card. Therefore, there may be the least possibility that a malicious third party decodes the key code.

Said database stores names of card owners and key codes of the cards in advance.

The present invention enables the use of various methods of creating random capacitances. One of the most typical methods is using dielectric films of different thicknesses or kinds. A dielectric film whose thickness varies at random can be prepared by forming a dielectric film such as a BST film on the electrodes by a known method or the like and scanning the surface of the film by a laser beam with its intensity varied at random to cause evaporation on the surface of the film. Further said film can be prepared also by placing a layer of dielectric material made of fine dielectric particles between the electrodes of the card base and the electrodes of the IC chip and applying a pressure which varies at random to the film of the dielectric material.

DESCRIPTION OF THE PREFERRED EMBODIMENTS

Embodiment 1

Figure 1:
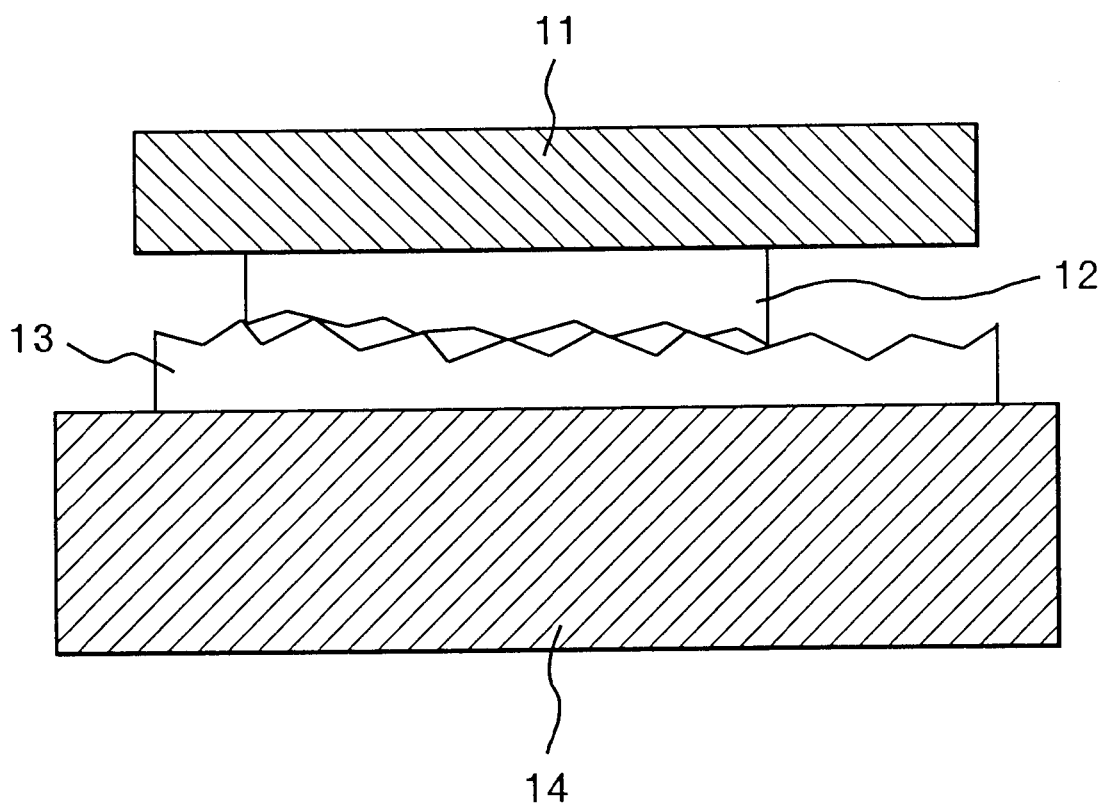
FIG. 1 is a sectional view of a first embodiment of the present invention.

A first embodiment of the present invention will be explained below referring to FIG. 1. The base 14 of the IC card has an electrode 13. The IC chip 11 also has an electrode 12. Said electrodes 12 and 13 have rough surfaces (having irregular dents and projections on them). When these rough surfaces of the electrodes are in close contact with each other, the contact resistance between the electrodes is unique and random depending upon the contact status of rough surfaces of the electrodes. The roughness of electrode surfaces (dents and projections) is in the range of ±1 nm to ±100 μm.

The analog value of this contact resistance can be converted into a digital value of 1 to about 10 bits long. In other words, this bit size is the number of bits for A/D conversion. The obtained information is 1-bit data when the on-off status is converted or 10-bit data when the resistance value is A/D-converted at accuracy of 10 bits.

The present invention does not limit the number of electrodes. Both the card base and the IC chip can have a plurality of electrodes. Therefore these electrodes can electrically offer numerous random patterns (dispersed resistance values after analog-to-digital conversion). Substantially it never happens that two or more identical patterns generate. The possibility of a pattern regeneration can be further reduced by the use of a high-precision measuring instrument. It is necessary to cancel resistance drifting due to temperature changes.

Once these electrodes are separated, their contact is broken and their original connection status (resistance) is lost permanently and never regenerated. In other words, when a try is made to decompose the IC chip, the above destruction of connection status occurs everywhere on the IC chip. Therefore this structure is very effective for protection against physical and chemical forgery and falsification. The memory of this construction can be considered as a self-destructive memory without a battery as the content of memory is lost if any attack is made upon the IC chip.

Figure 2:
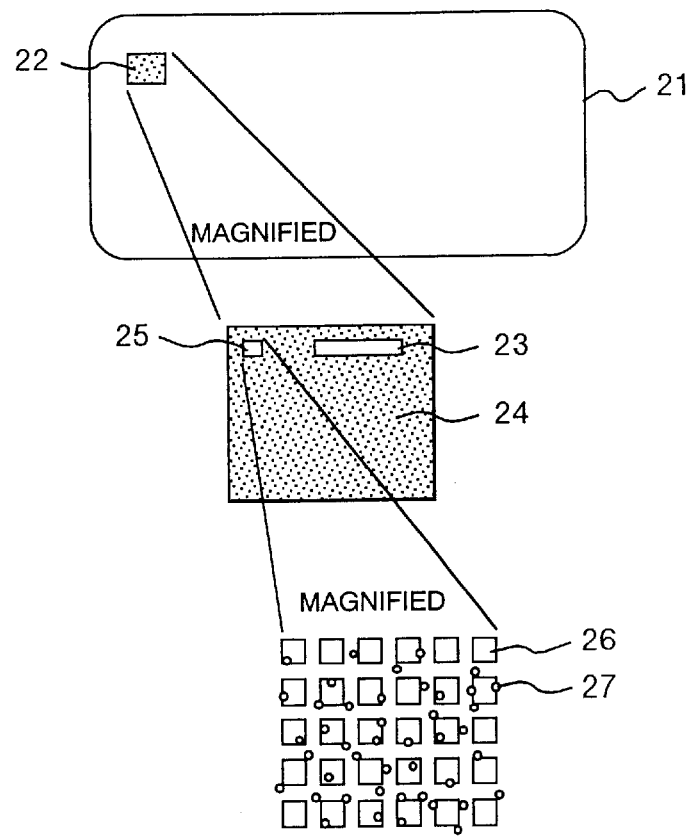
FIG. 2 is a plane view of an IC card which is an embodiment of the present invention.

Referring to FIG. 2, an IC card which is another embodiment of the present invention will be explained below. The IC card of this embodiment has an IC chip section 22 at one of four corners of the card. An IC chip 24 to be mounted on this section 22 contains an electrode area 25 and a memory area 23. A plurality of electrodes 26 in the electrode area 25 of the IC chip are connected to the electrodes (not shown in FIG. 2) on the IC card base opposite to the electrodes of the IC chip via conductive particles in the anisotropic electroconductive adhesive material. The contact resistance between each set of electrodes is converted into part of a key code in an analog-to-digital manner. Although this embodiment uses a plurality of electrodes, the IC card can have only one set of electrodes. The IC chip is mounted on the IC chip section with the IC chip faced down so that the electrodes of the IC chip may be correctly connected to the electrodes on the card base. To make the roughness of electrode surfaces more effective and to protect the memory content against chemical and transparent attack, it is recommended to use fine conductive particles in the anisotropic electroconductive adhesive material whose main ingredient is equal to that of the electrodes (e.g. gold particles, when the electrodes are made of gold or aluminum particles when the electrodes are made of aluminum). This means can easily offer random A/D-converted patterns of contact resistances. When the area which generates a key code is made smaller and when the fine conductive particles are made smaller (e.g. under 15 microns or preferably 5 microns to 10 microns), the electrode array can be made very compact. Further when the electrodes to be connected are arranged in an array form, the electrode section can be made smaller (at higher efficiency per unit area).

Figure 3:
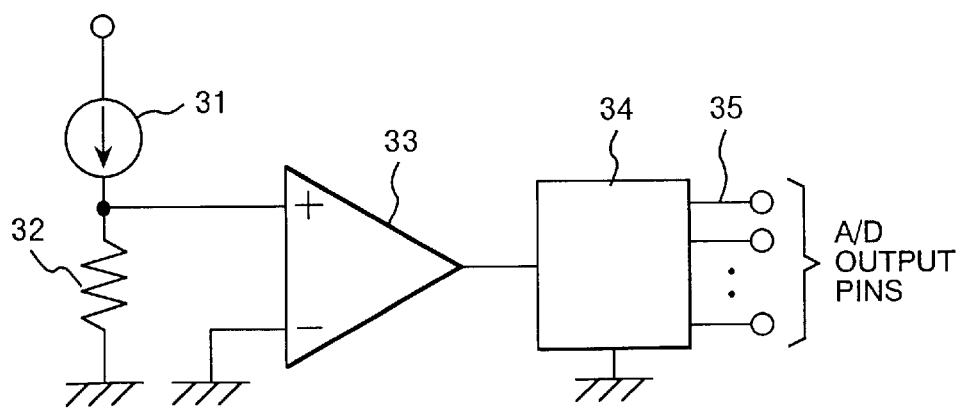
FIG. 3 is a functional block diagram of a circuit of an IC which is an embodiment of the present invention.

Referring to FIG. 3, will be explained a means to convert a contact resistance 32 of an electrode in FIG. 2 into a key code. When a current 31 is applied to the contact resistor 32 of electrodes, a voltage generates across the resistor 32. This voltage is amplified by the amplifier 33, converted into a digital value by the analog-to-digital (A/D) converter, and output as a voltage signal from the output pins 35. This voltage signal is used as a key code of the IC card. For example, when the A/D converter has 10 bits, the voltage signal 1 mV to 1023 mV (under conditions of maximum voltage of about 1 V at resolution of 1 mV) is expressed as 0000000001 (=1 mV) to 1111111111 (=1023) in binary. The analog/digital converter is housed in the IC chip containing this electrode.

Figure 4:
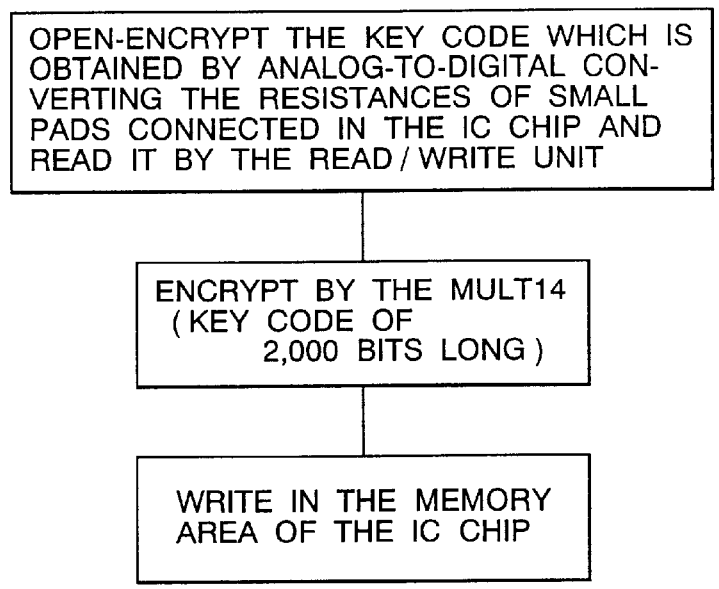
FIG. 4 is a drawing of an embodiment of the present invention.

A method of writing a key code in the memory area of the IC chip will be explained referring to FIG. 4. The read/write unit (RWU) reads an A/D-converted key code from the IC card and encrypts it. For example, a key code "111111111" is encrypted into "101010101." The encrypted code "101010101" is written in the memory area in the IC chip of the IC card.

Or the A/D-converted key code is encrypted in the chip of the IC card, read outside the IC card, encrypted there, and written back into the memory area in the IC chip of the IC card. When the key code is internally open-encrypted, only the authorized person can read the A/D-converted key code. The open-encryption makes the key code open and allows anyone to encrypt it, but the key code cannot be decoded. For example, only the authorized persons can decode the encrypted documents sent from a lot of people.

The A/D-converted key code or the encrypted key code is encrypted by a card reader or a host system, sent back into the IC card again, and written in the memory area of the IC chip.

There is an example of encrypting an encrypted code. This technique encrypts a code with a specific key and sends it with an open key. This code can be decoded only by a selected person (e.g. electronic signature). A technique of encrypting an non-encrypted code has been used by satellite broadcasting, pay televisions, and so on. This is a scrambling encrypting technique.

The content of this memory is written, for example, in a non-volatile memory and used as an identification (ID) number of the IC card. This ID number is collated each time the card is used. As it is substantially impossible to regenerate this number, this number can be used as the ID number of the card and for certification of the card.

Even when a malicious third person tries to simulate an A/D-converted value to regenerate the ID number, the person will never be able to regenerate it because the host system will not disclose the encrypted codes.

That is, it is possible for the person to read the content of the memory but the person cannot regenerate processes of random-number generation, A/D conversion, and encryption. Any forged or falsified IC card will easily be detected by the system.

Further, the forged or falsified IC card is immediately rejected because the card is collated by a collating sequence. The collating sequence collates the code in memory of the IC card by a code which is obtained by A/D-converting the contact resistances of the card and encrypting it with an encryption key in the system.

Figure 5:
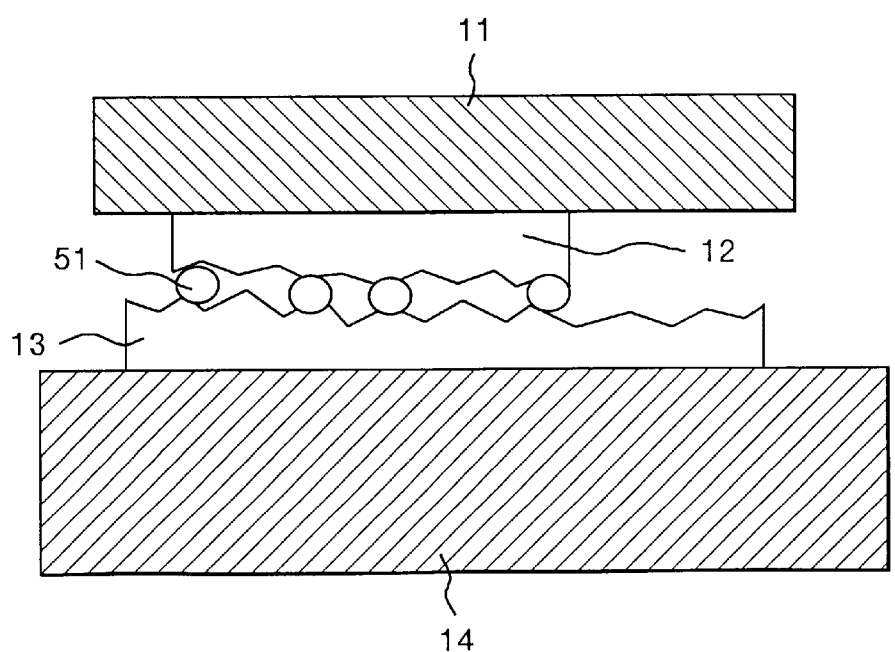
FIG. 5 is a drawing of an embodiment of the present invention.

FIG. 5 shows an embodiment of the present invention in which electrodes are connected with anisotropic electroconductive adhesive material containing fine conductive particles 51. The fine conductive particles dispersed in the space between the electrodes are greater than dents and projections of the electrodes in size and function like the dents and projections formed on the electrodes. If the electrode surfaces are smooth and flat or their dents and projections are so small (1 $\mu$m or smaller, differences of contact resistances are not so distinct. In such a case, fine conductive particles of 5 $\mu$m to 10 $\mu$m in diameter will be effective to make the differences distincter.

Additionally, there are various factors to generate resistance values at random such as electrode surface status, conductive particle surface status, connecting places, deformation by connection, quantity of electrodes, electrode surfaces, etc. The fine conductive particles can be gold-plated plastic particles, nickel particles, etc. of various sizes or combinations thereof. These conductive particles can be cemented firmly by epoxy adhesive resin with the particles dispersed completely, which can keep the connection of the electrodes stable.

Figure 6A:
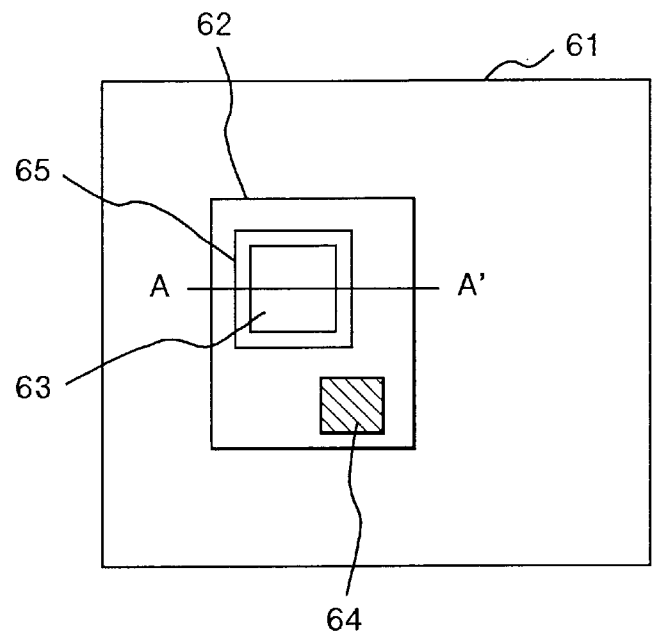
FIG. 6 is a drawing (plane and sectional views) of an embodiment of the present invention.
Figure 6B:
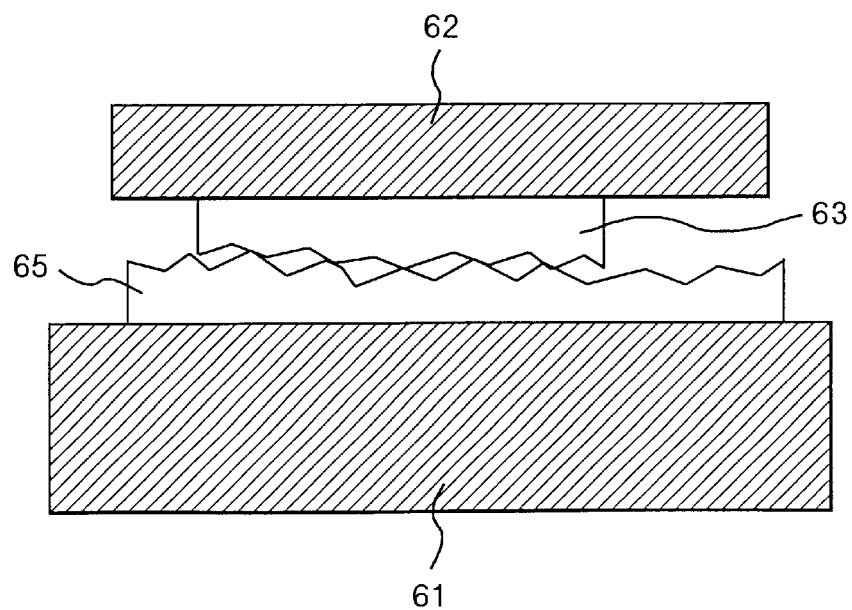

FIG. 6 shows the top and sectional views of an IC card which is an embodiment of the present invention. This IC card comprises an IC chip and a card base (sheet). The sheet and the IC chip respectively have the same number of electrodes whose surfaces are rough (having irregular dents and projections of ±1 nm to ±100 μm in size). The electrodes of the IC chip are one-to-one connected to the electrodes of the sheet. The contact resistances of these electrodes are measured, A/D-converted, and used as the key code of the IC card. The sheet can be made of a PET resin. FIG. 6(a) is the plane view of the IC card. A sheet 62 is placed over the electrode 65 of the IC chip 61 and the electrode 65 of the IC chip 61 is connected to the electrode 63 of the sheet 62. FIG. 6(b) is a sectional view taken along the line A–A' in FIG. 6(a). The structure of the IC card is identical to that of FIG. 6(a) and effective to generate random contact resistances (due to roughness of the electrode surfaces) and to destroy the content of memory when the connection is broken.

An electrode 64 pass through the sheet and the IC chip to monitor the contact resistance between the rough electrodes. Although FIG. 6(a) shows the connection of one pair of electrodes, the IC card can have many sets of electrodes on it. This technique is also applicable to IC cards whose IC chip is mounted and wire-bonded on the IC card base with its face up. In other words, this technique can give a key code using contact resistance information to every IV card independently of methods of mounting the IC chips. With this technique using a card sheet, you can enjoy the convenience of the IC cards safely.

Figure 7:
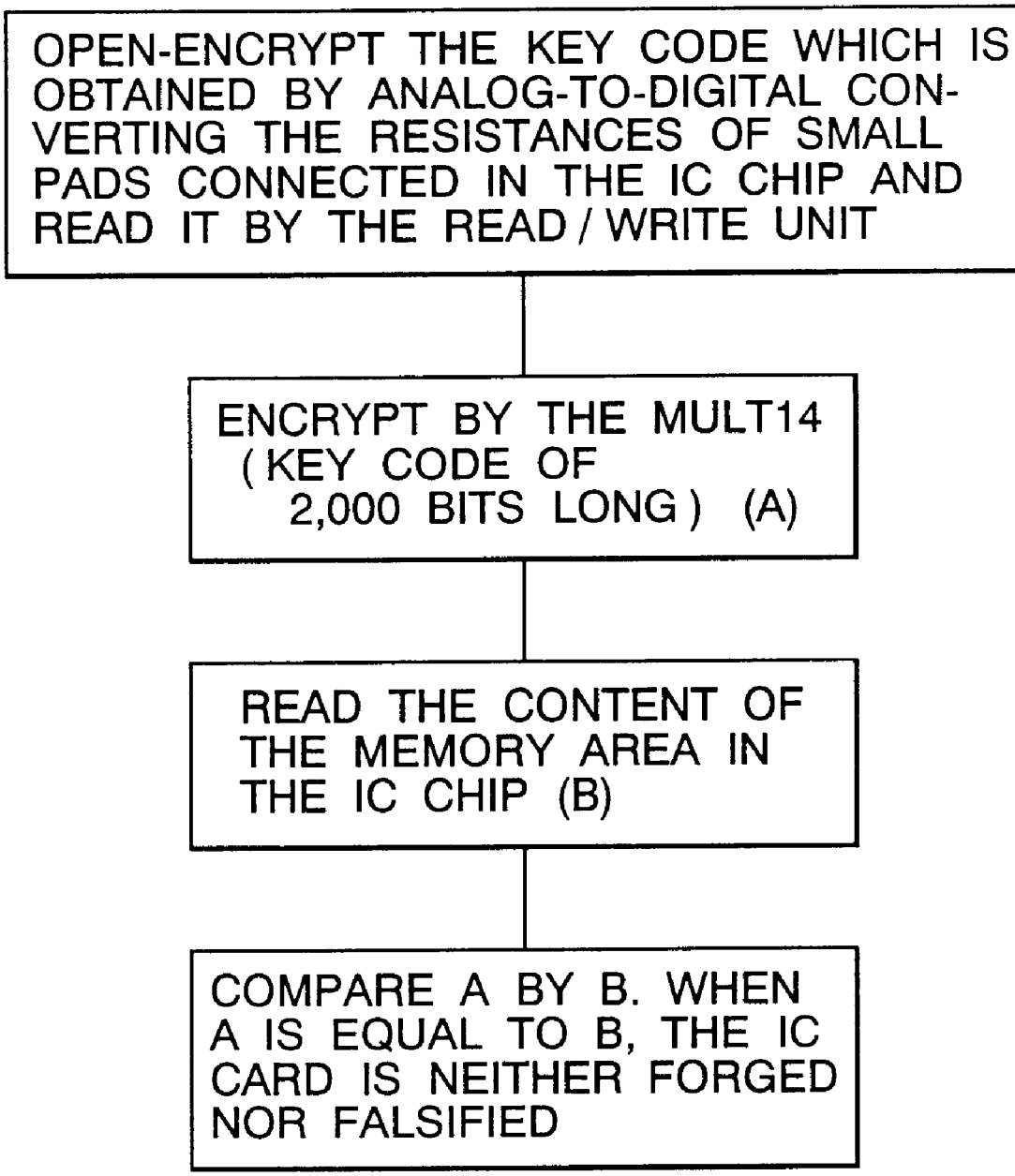
FIG. 7 is a drawing of an embodiment of the present invention.

FIG. 7 shows an operating flow to certify a key code of an IC card in accordance with the present invention. As the credit grantor's system allows the owner of this IC card to use much more money than the owner of a magnetic card, more strict certification processes are required. Such processes are (1) Identification of the card owner, (2) Inspection of card for forgery or falsification, and (3) Mutual certification between IC card and read/write unit. The IC cards in accordance with the present invention satisfy all of the above requirements (1) to (3).

The operating flow in FIG. 7 is to inspect an IC card for forgery or falsification. First the IC chip open encrypts the key code which is obtained by A/D-converting the resistances of small pads connected in the IC chip. The read/write unit reads the code. The key is unique as it is generated at random. Therefore, there may exist no other IC card having the same key code.

Further, this key code is obtained by A/D-converting contact resistances of micro areas on the IC card and converted into a digital value by micro elements and wires in the IC card. Therefore, it is very hard to read it electrically in direct contact with the IC chip.

However, if the digitally-converted key code is read directly in a bit string form by the read/write unit, the key code may be easily read by a malicious third person (by line monitoring). To prevent this false reading, the IC card internally encrypts the key code with a given open key code and the read/write unit reads this open key code. This key code will never be decoded by line monitoring.

The key code of the IC card is read and encrypted in a common key encrypting method (e.g. with a 2000-bit common key). Let's assume the resulting code is Code A. Next, the content of the memory area of the IC card is directly read. Let's assume the read code is Code B. When Code A is equal to Code B, the IC card is certified to be genuine.

The above open key-code decoding and common key-code decoding can be done by a read/write unit. Further when these decoding operations are done by a host system, protection of the IC card against false accessing is assured more completely. (The key codes cannot be read falsely even when the read/write unit is decomposed by a violator.)

As explained above, the key code created in the IC card in accordance with the present invention can be used to prevent forgery and falsification of IC cards.

Figure 8A:
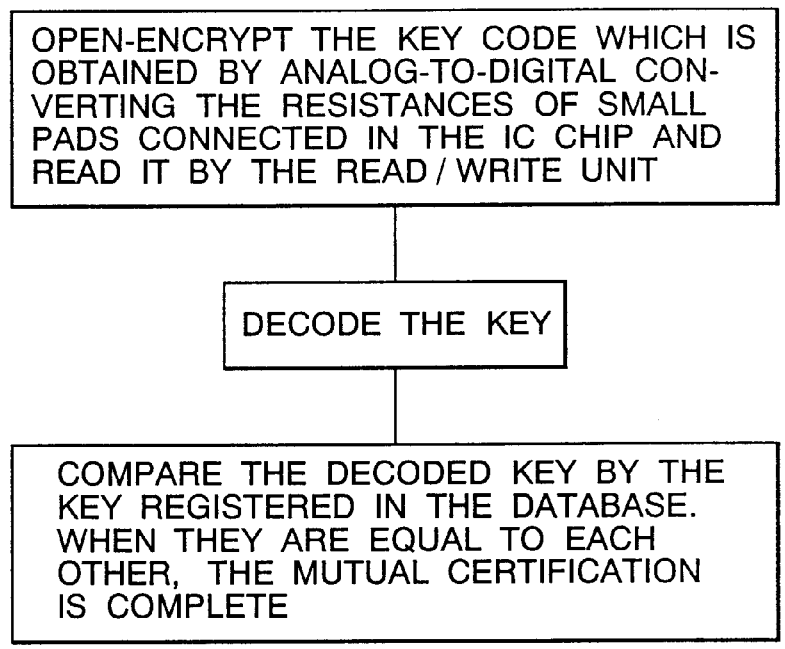
FIG. 8 is a drawing of an embodiment of the present invention.

FIG. 8 shows sample operating flows for mutual certification between IC card and read/write unit (see (3)) FIG. 8(a) shows a first sample operating flow for mutual certification. This method open-encrypts the key code which is obtained by A/D-converting the contact resistances of small pads (smaller than wire-bonding pads, 100 μm or smaller) connected in the IC chip of the IC card. The read/write unit reads and decodes the key code, and compares it by the key code of the IC card read from the database of the system. When these key codes are equal to each other, mutual certification is complete. The database stores the key code together with data and log (time, item, charge, location, etc. of each purchase) of each card owner. The key codes are under strict management of the system.

Figure 8B:
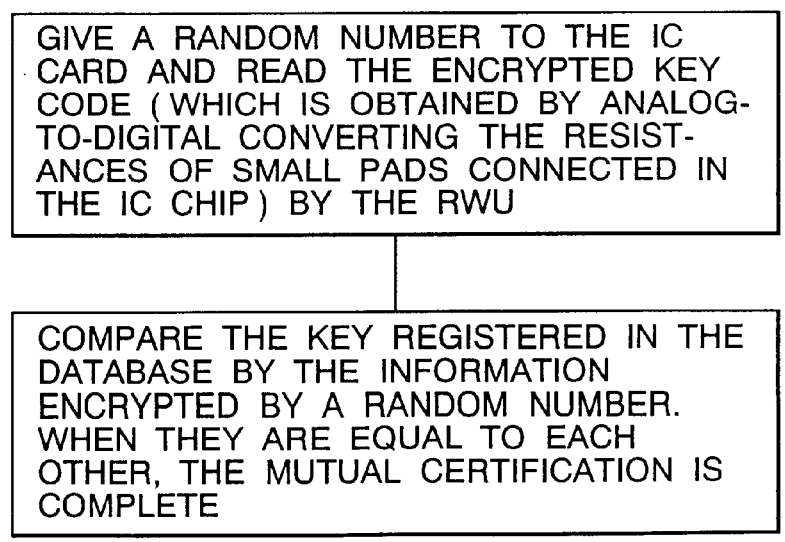

FIG. 8(b) shows a second sample operating flow for mutual certification. The read/write unit generates a random number in the random number algorithm of the MPU (microprocessor) in the read/write unit, gives it to the IC card. The IC card sends the encrypted key code (which is obtained by A/D-converting the resistances of small pads connected in the IC chip) by the RWU. After generating a random number, the read/write unit gets a key code of the IC card from the database of an application system which is connected to the read/write unit through LAN, radio, or Internet, encrypts the random number with the key code into information and compares the information by the former encrypted key code. When they match, the mutual certification is complete.

Figure 9:
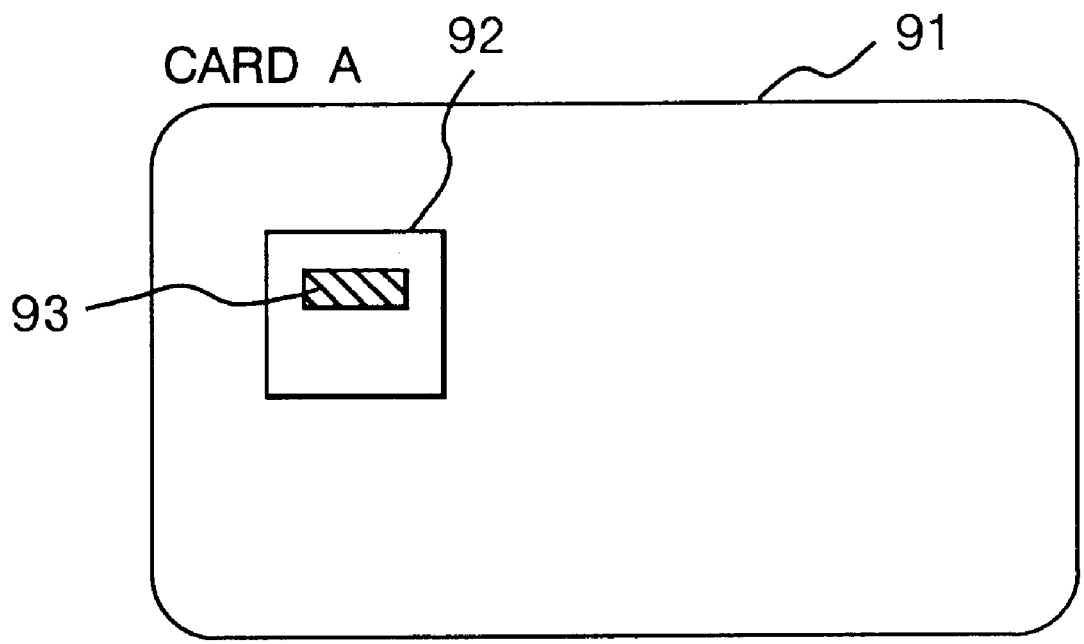
FIG. 9 is a drawing of an embodiment of the present invention.
Figure 9:
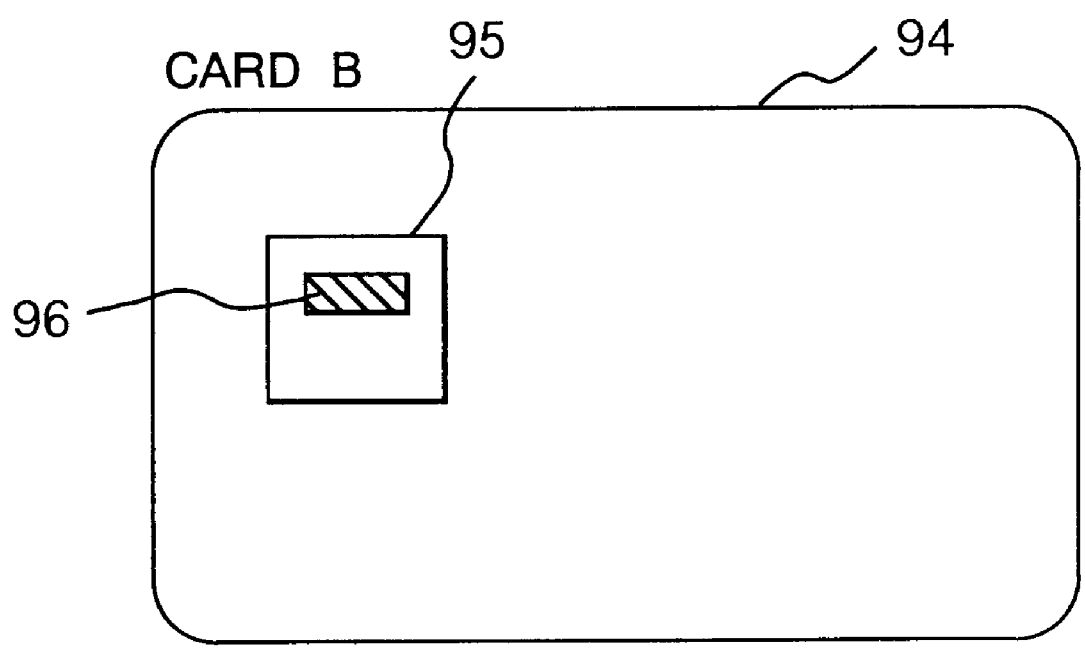

Referring to FIG. 9, a method will be explained to identify a plurality of radio-type IC cards by a single read/write unit. In accordance with the present invention, IC cards will seldom have an identical ID code. Therefore, the ID codes can be used effectively for identification of IC cards. The IC card 91 has an IC chip 92 on it. The chip 92 contains a key-code generating section 93. Another IC card 94 also has another IC chip 95 on it and the IC chip contains a key-code generating section 96. As the key code generating sections of the IC cards 91 and 94 have different key codes, the IC cards can be identified by these key codes. A great number of ID codes can be prepared by increasing the bits of the code. Thus, almost infinite IC cards can be identified by key codes.

Figure 10:
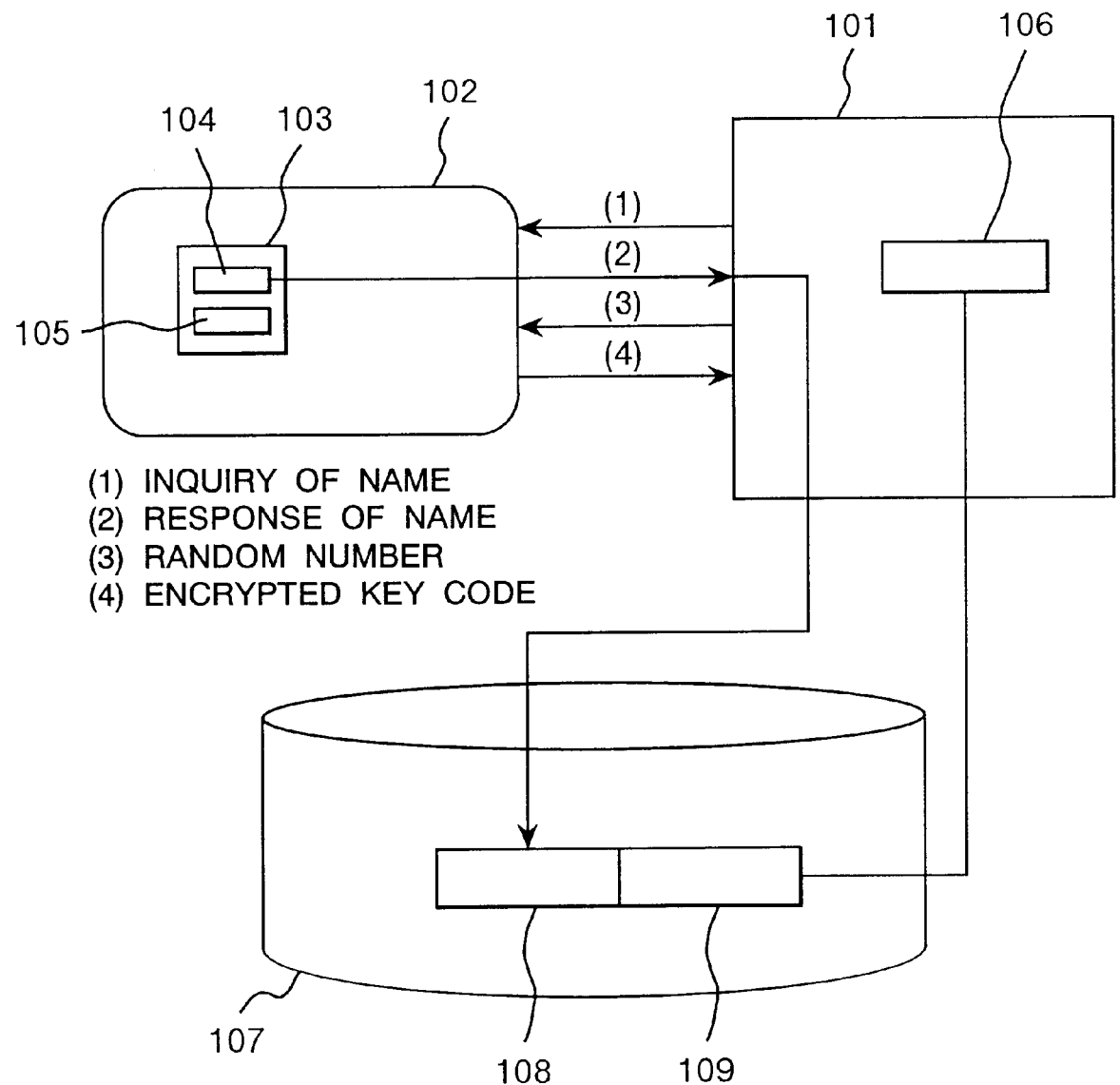
FIG. 10 is a drawing of an embodiment of the present invention.

FIG. 10 shows the configuration of a system for identifying and certifying IC cards each of which has a key code in accordance with the present invention. The system consists of an IC card 102, a read/write unit 101, and a database 107. The function of each component will be explained below according to the operational sequence.

(1) The read/write unit inquires the IC card of its name code or ID code 104 to identify the owner of the IC card. The name code or ID code 104 has been stored in a predetermined area of memory in the IC chip 103. The read/write unit can detects an IC card by an LED sensor. Power is electromagnetically supplied to the non-contact card. To check whether the card functions normally, the read/write unit sends a RESET signal to the IC card. The IC card returns a card status code (Answer-to-Reset) to the read/write unit. The IC card is electromagnetically powered on and reset. The read/write unit sends a READ command with an address to the IC card. Upon receipt of this command, the IC card sends its name code to the read/write unit. The read/write unit checks this name code.

(2) The IC card sends the name code 104 to the read/write unit in this way. When receiving the command from the read/write unit, the IC card activates its circuit, reads its name code, and sends the name code to the read/write unit.

(3) The read/write unit searches the name code 108 in the database 107 and gets the key code 109 from the database. In this case, the read/write unit sends a READ command together with a memory address which stores the name code. If a plurality of IC cards are read simultaneously, one card is selected by a congestion control. The congestion control method selects only one card by reading the "0"/"1" status of each bit of codes of IC cards.

(4) The read/write unit sends a random number to the IC card. The random number is generated for example in the MPU circuit of the read/write unit. The random number can also be supplied from a server through LAN or Internet.

(5) When receiving the random number and a command from the read/write unit, the IC card encrypts the key code which is generated by the key code generator 105 with the random number. At the same time, the read/write unit encrypts the key code 106 which is obtained from the database with the same random number that was sent to the IC card in the same was as the IC card does. The read/write unit compares these two encrypted values. When the value are equal to each other, the mutual certification between the IC card and the read/write unit is complete and the IC card is certified to be genuine. The read/write unit is connected to the server through LAN, Internet, lines, etc. The server has a database. Further, a plurality of read/write units can be connected to the server.

The key code (ID code) of the created IC card is stored in the database together with a name code or ID code.

This key code (ID code) of the created IC card is used for mutual certification between the IC card and the read/write unit. The key code of the created IC card can be used together with a password code or biological characteristic code to identify the card owner.

The biological characteristics code can be a palm code, finger print code, body smell code, face code, analyzed or digital voice code, vein code, pupil color/shape code, or DNA code.

The created key code can be used for identification of a card owner, inspection for forgery and falsification, and mutual certification between the IC card and a read/write unit when the IC card is used as a kind of electronic money. With the use of key codes in accordance with the present invention, IC cards can be protected against false use, forgery and falsification, which leads to safe management of properties and personal information.

Said card certification system is applicable to various service fields (traffics, transportation, financial, etc.) such as for payment in shops and stores, purchase of tickets, use as traffic passes, substitution of driver's licenses, use as telephone cards, etc. For example, the card owner can purchase goods just by passing the IC card through a read/write unit, go to the movies and enter the hall without joining a line to buy a ticket, make reservations for hotels and pay their charges, and pay for Internet services, cable TV, educational services, etc. In other words, IC cards can be used instead of the plastic credit cards and further for immediate payment of small amount of money. Further, the IC cards can be used to access computer systems and system locations.

Figure 11:
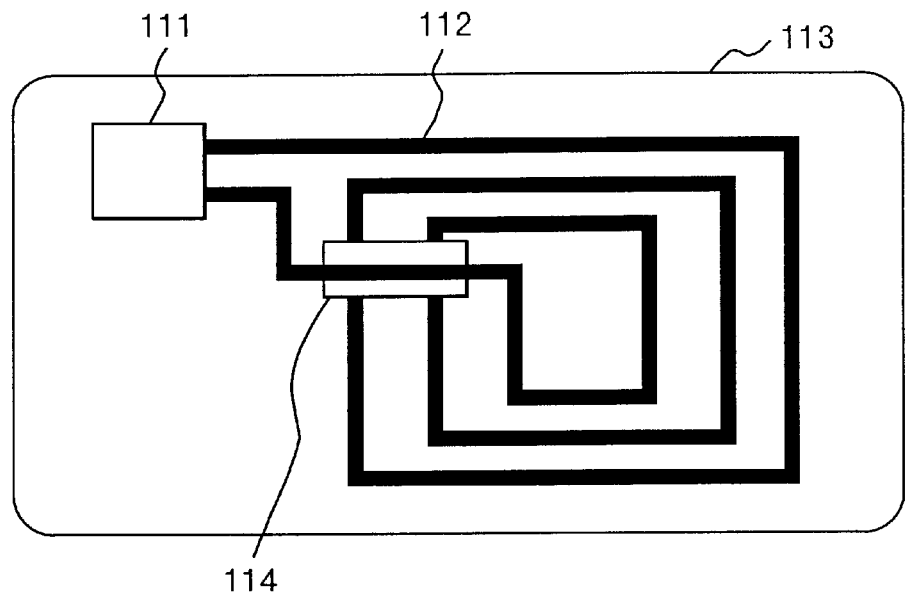
FIG. 11 is a drawing of an embodiment of the present invention.

FIG. 11 shows an example of configuration of a non-contact IC card in accordance with the present invention.

The IC chip 111 is buried approximately in the center layer of the card base 113 and connected to one end of a coil pattern 112 which is formed approximately in the center layer of the card base 113. The other end of the coil pattern returning to the IC chip is insulated from any other part of the coil pattern with an insulating film 114 to prevent short-circuiting.

Figure 12:
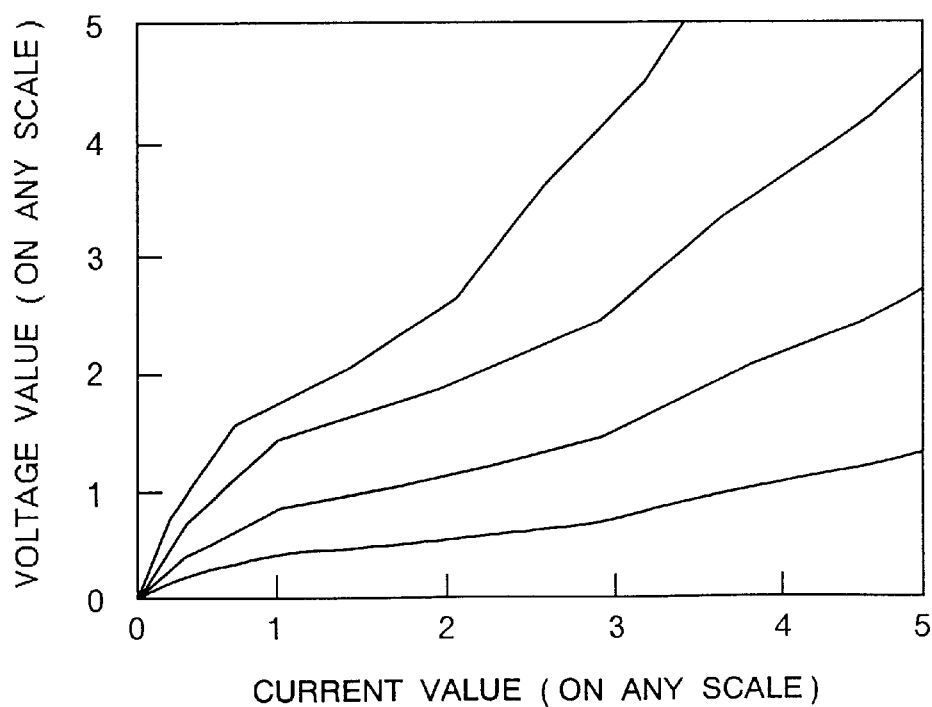
FIG. 12 is a drawing of an embodiment of the present invention.

FIG. 12 shows the relationship between voltages (on the Y axis) applied to a connection of electrodes (IC chip electrode and card base electrode) having dents and projections on them and currents (on the X axis) passing through it. This graph has four typical characteristic curves. However, these characteristics generate at random and characteristics of resistances of electrode connections are different. A current of 0.1 mA to 1 mA is recommended to get distincter voltage differences.

The present invention uses the dispersion in such characteristics, but the resolution of analog-to-digital conversion will not limit the designing of the IC cards.

For effective regeneration of resistances, it is recommended to use four resolution levels. Four resolution levels can be obtained by preparing electrode of 1 $\mu$m to 15 $\mu$m square, placing elements (e.g. particles of different sizes and shapes) which can increase the dispersion of contact resistances between opposed electrodes, applying a current to the connection of these electrodes, getting a voltage across this connection of electrodes, and A/D-converting the voltage into a 2-bit value. The resulting resolution levels are "00," "01," "10," and "11."

The contact resistances are dependent upon the status of electrode surfaces and will be affected as the time goes by. For steady and reliable regeneration of contact resistances, it is recommended to use comparatively low resolutions of wider ranges.

The resolution of contact resistances is also dependent upon the accuracies of circuits of converting the contact resistance into a voltage value and converting the analog voltage value to a digital value. The resolution is also affected by temperature drifts, stresses, and changes with a time lapse. The preferable resolution range is 2 to 10,000.

Further, an analog/digital conversion range is set to make the contact resistances stable on the boundary area. The boundary area is a boundary for determining digital values (e.g. between "10" and "11").

The ability of regeneration can be increased when four or less A/D conversion resolution levels (2 to 4 levels) are used. When the created key codes are used to identify each of cards which are simultaneously used, the IC cards can be more safe and reliable.

Embodiment 2

Figure 13:
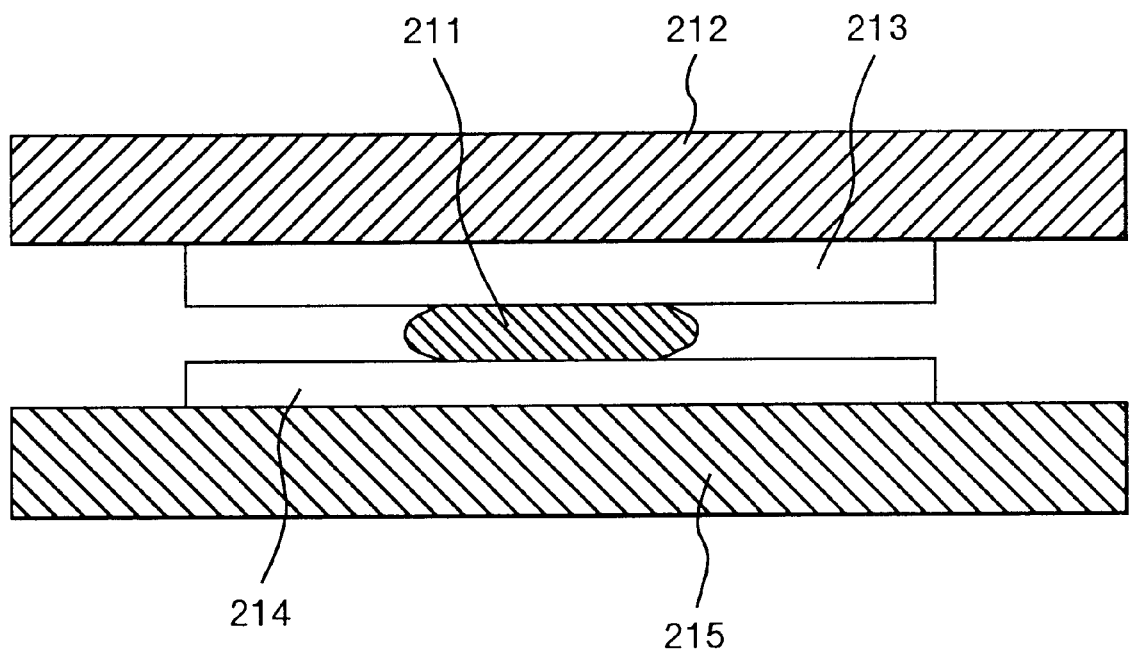
FIG. 13 is a drawing of a second embodiment of the present invention.

FIG. 13 shows the sectional view of an IC card which is a second embodiment of the present invention. This IC card comprises a semiconductor chip 212 and a card base 215. The semiconductor chip 212 has an electrode 213 made of gold (Au) of 0.1 $\mu$m to 50 $\mu$m thick on the IC chip. The card base 215 made of PET of 0.1 mm to 1.0 mm thick also has an electrode 214 made of silver paste on the card base 215. These electrodes 213 and 214 are face-to-face connected with a dielectric film 211 made of BST (BaSrTiO$_3$).

The capacitance between said electrodes 213 and 214 is dependent upon the material, thickness, and spread area of the dielectric film 211. The dielectric film 211 can be in any form (granular, liquid, or gel). This embodiment uses a film of granular BST between the electrodes 213 and 214, and presses the electrodes together with different pressures to change the thickness and form of the dielectric material 211. This makes the capacitance random in a wide range.

For example, a capacitance of 45 picofarads is obtained by pressing a dielectric film 211 (a film of BST particles of 1 μm in diameter) between electrodes of 1×10000 square microns to make it 1000 nm thick.

After this capacitance is obtained, the electrodes 213 and 214 and the dielectric film 211 are solidified in a body with a plastic resin (not shown in FIG. 13). This resin can be a medium which disperses dielectric particles between the electrodes 213 and 214 and forms a dielectric film therebetween. Further, the resin can be applied to secure the electrodes 213 and 214 and the dielectric film 211 after forming the film 211 between the electrodes 213 and 214. In any of the above cases, a random capacitance in a wide range can be obtained.

This method of deforming a film of granular BST particles to form a dielectric film is effective to change or set the area and thickness of a dielectric film whose sectional shape is hard to be measured. Therefore, this method can make the production of IC cards simpler and easier.

Although this embodiment places a single dielectric film between a set of electrodes 213 and 214 but the single dielectric film can be substituted by two or more dielectric films or a dielectric film containing dielectric particles of different shapes. Further "a set of electrodes" can be substituted by two or more sets of electrodes and the electrodes need not be identical in size. All of the above means can change thicknesses and areas of dielectric BST films 211 between electrodes 213 and 214 to have random capacitances.

Embodiment 3

Figure 14A:
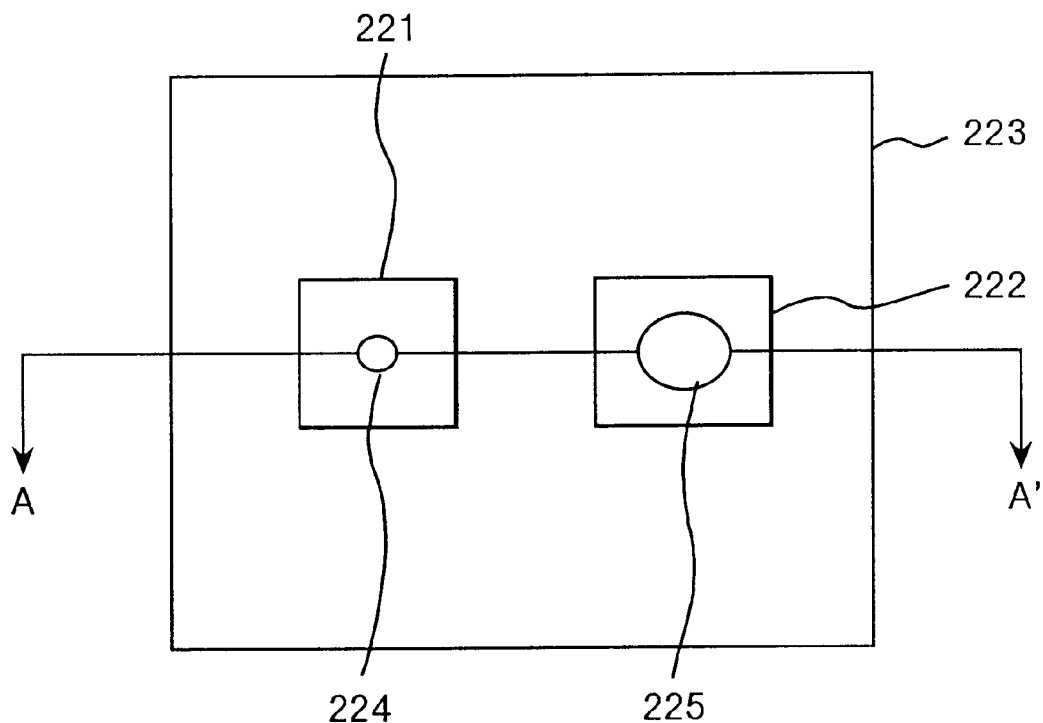
FIG. 14 shows plane and sectional views of a third embodiment of the present invention.
Figure 14B:
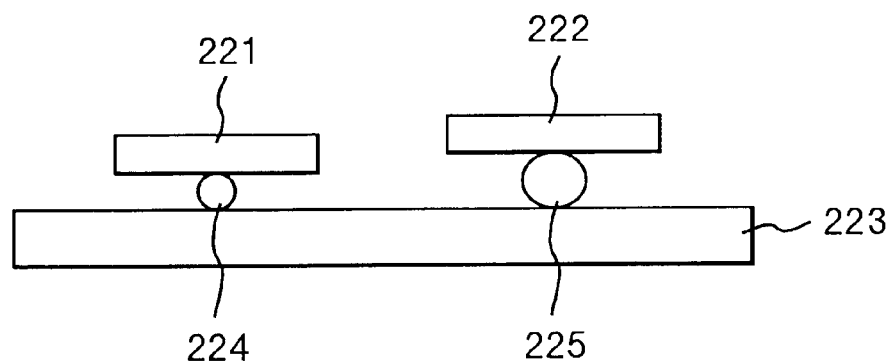

The third embodiment of the present invention will be explained below referring to FIG. 14. FIG. 14(a) shows the plane view of this embodiment and FIG. 14(b) shows a sectional view taken along the line A–A' in FIG. 14(a).

The first electrode 221 and the second electrode 222 are respectively faced to the third electrode 223. Particles 224 and 225 between electrodes are fine dielectric particles made of BST (BaSrTiO$_3$). Dielectric particles 224 between electrodes 221 and 223 are smaller than those 225 between electrodes 222 and 223.

Said dielectric particles 224 and 225 are various (random) in size as they are formed by a known gas-deposition method. Naturally as the particles have an identical dielectric constant but are different in diameter, the capacitance between electrodes 221 and 223 is different from that between electrodes 222 and 223. In other words, as the diameters of dielectric particles are randomly different, the electrodes can have different capacitances at random. As far as capacitances are obtained, the electrodes 221 through 223 can have any materials and shapes.

Embodiment 4

Figure 15A:
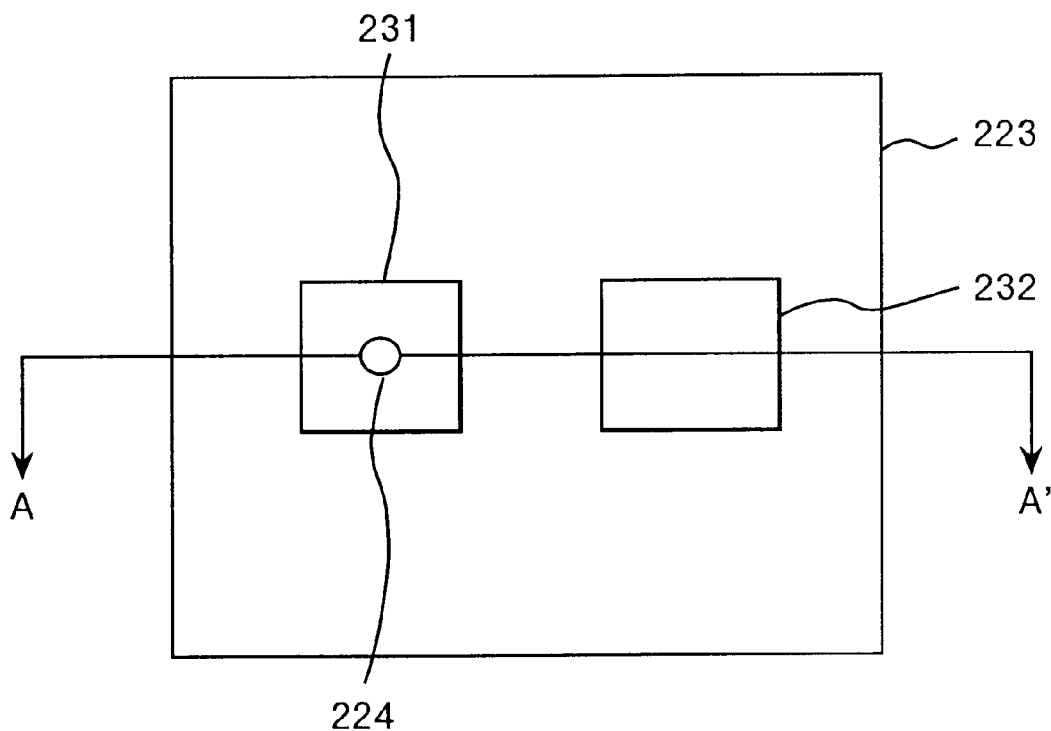
FIG. 15 shows plane and sectional views of a fourth embodiment of the present invention.
Figure 15B:
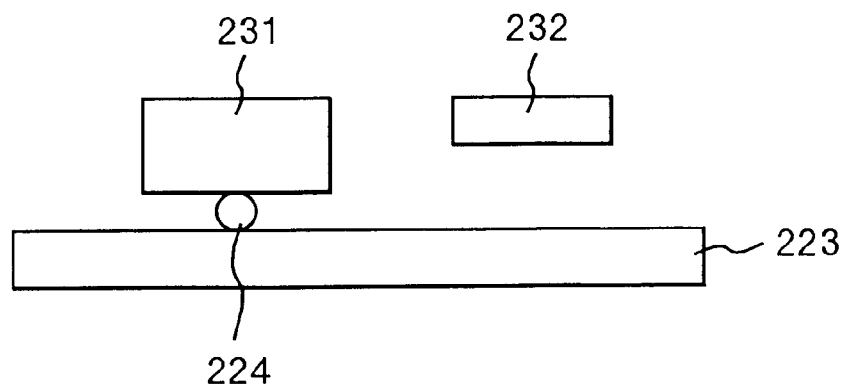

The fourth embodiment of the present invention will be explained below referring to FIG. 15. FIG. 15(a) shows the plane view of this embodiment and FIG. 15(b) shows a sectional view taken along the line A–A' in FIG. 15(a).

The first electrode 231 and the second electrode 232 are respectively faced to the third electrode 223. Fine particles 224 are jammed between electrodes 231 and 223. However, as shown in FIG. 15(b), the second electrode 223 is very thin and the space between the second and third electrodes is too large to hold dielectric particles. Consequently, the capacitance between the second and third electrodes is much smaller than the capacitance between the first and third electrodes.

As the electrodes 231 and 232 are randomly various, the space between electrodes 231 and 223 and the space between electrodes 232 and 223 are randomly various in size.

Consequently the electrodes 231 and 232 can have capacitances which are randomly different. This embodiment created electrodes 232 and 232 having different random thicknesses by filing away the surfaces of plated electrodes by laser.

As far as capacitances are obtained, the electrodes 223, 231, and 232 can have any materials, shapes, and sizes.

Embodiment 5

Figure 16:
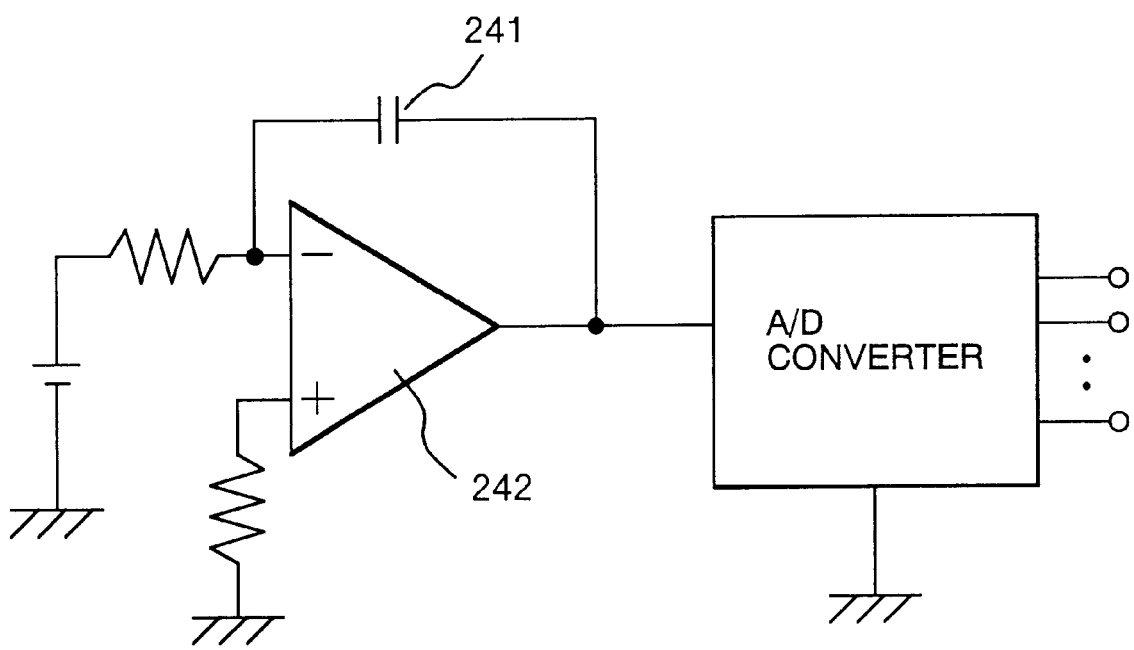
FIG. 16 is a drawing of a fifth embodiment of the present invention.

The fifth embodiment of the present invention will be explained below referring to FIG. 16. The capacitance 241 is what is obtained by said embodiment 1. The amplifier 242 is housed in a semiconductor chip which is electrically connected to said capacitor 241. The capacitor 241 and a resistor which is electrically connected to the amplifier 241 form an integrating circuit to generate a voltage value. This voltage value (analog value) is converted into a digital value.

As the capacitance 241 is random as explained above, the voltage value which appeared and the resulting digital value are also random. Further, it is needless to say that the capacitance will never be regenerated if this sectional relationship is destructed or the semiconductor chip is separated as the capacitance is dependent upon the sectional relationship (or the layer structure) of the semiconductor chip and the card base.

Embodiment 6

Figure 17:
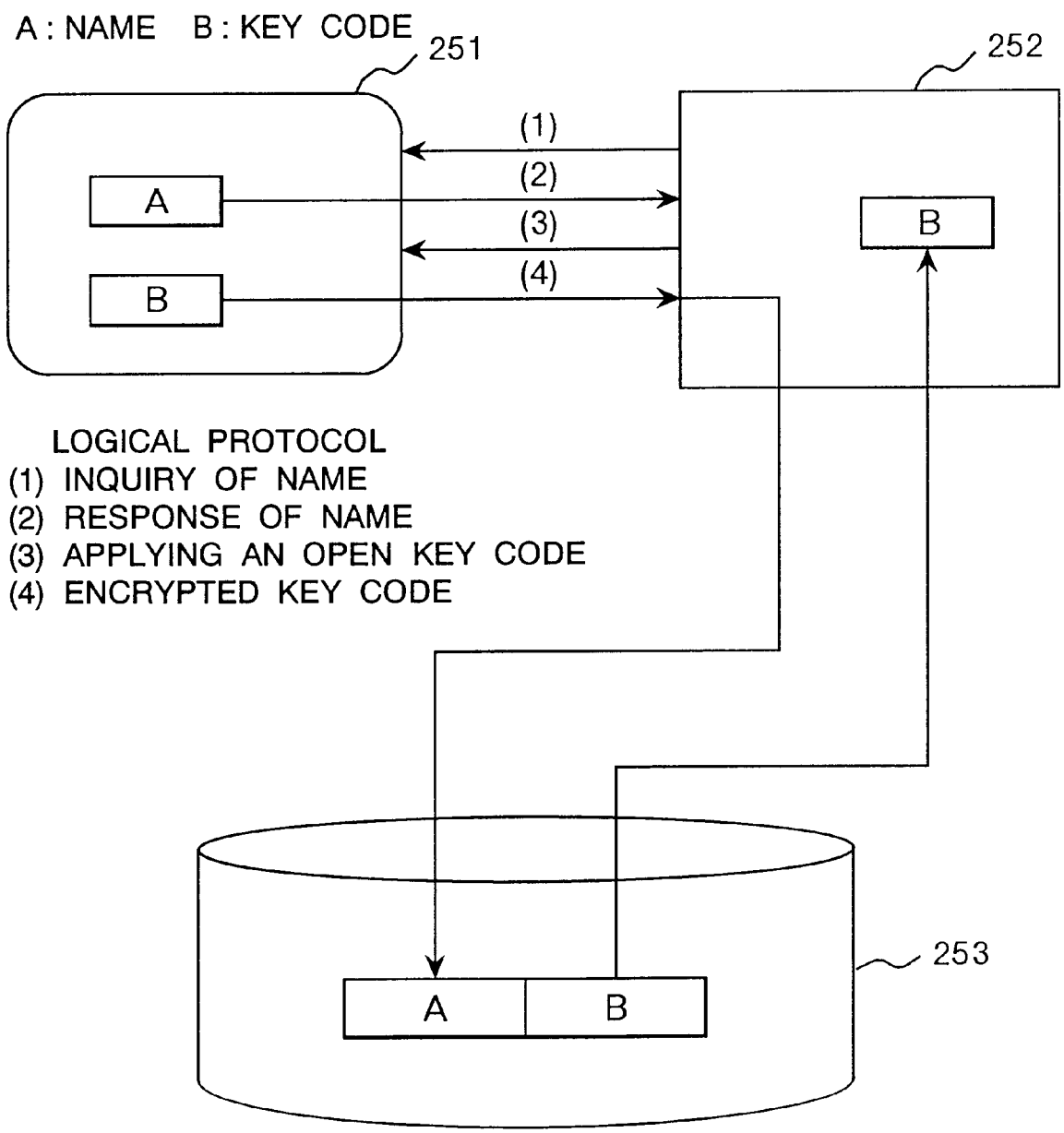
FIG. 17 is a drawing of a sixth embodiment of the present invention.

FIG. 17 is a conceptual diagram of a credit grantor's system which processes consumer's dealings, charges, balancing, etc. on the use of IC cards in accordance with the present invention.

An IC card 251 in accordance with the present invention contains a semiconductor chip in it. The semiconductor chip includes a name area and a key code.

The read/write unit 252 inquires the IC card 251 of the name of the card owner. (Step 1) Upon this request, the IC card 251 sends the name A to the read/write unit 252. (Step 2) The read/write unit 252 receives the name A and sends it to the database 253 to inquire of a key code.

Then, the read/write unit 252 generates an open key code using a random number and sends this open key code to the IC card 251. (Step 3).

The IC card 252 encrypts a random value (a random capacitance value) realized by the present invention according to said open key code algorithm, and sends back the encrypted key code to the read/write unit 252. (Step 4) The read/write unit 252 decodes said encrypted key code and compares the key code by the key code B obtained from the database 253. When the key codes are equal to each other, the read/write unit considers it to be a genuine card.

The key codes will never be forged and falsified by malicious third people as they are converted from random capacitance values and encrypted according to the open key code algorithm using random numbers.

The key code area B of the database 253 stores the key code of the IC card 251 in advance. The possibility that the key codes may be simulated by line monitoring can be reduced greatly by generating open key codes at random.

Embodiment 7

Figure 18:
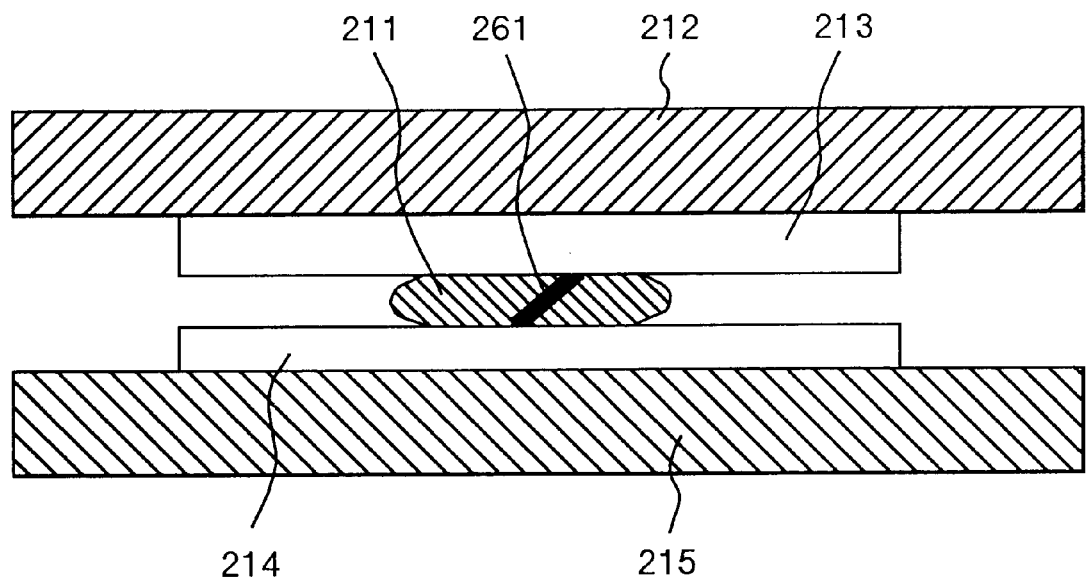
FIG. 18 is a drawing of a seventh embodiment of the present invention.

Another embodiment of the present invention will be explained below referring to FIG. 18. FIG. 18 shows the sectional view of the IC card in accordance with the present invention whose capacitance is broken by an electrical attack of a malicious third person. When a high voltage of 0.1 V to 1 V is applied between electrodes 213 and 214 to read the capacitance, the dielectric film 211 is partially destructed. The resulting short path 261 short-circuits the electrodes 213 and 214.

As the result, the electrodes 213 and 214 have an identical potential and lines of electric force disappear. Consequently, the capacitance disappears. Naturally, the capacitance cannot be regenerated. Namely, you cannot read the key code by decomposing the IC card.

This example shows a destruction of the dielectric film 211, but there are some other ways to protect the key code against a malicious attack to read. One of the ways is to put the electrodes 213 and 214 at an identical potential for example by providing an adequate circuit to short-circuit the electrodes therebetween.

Embodiment 8

Figure 19:
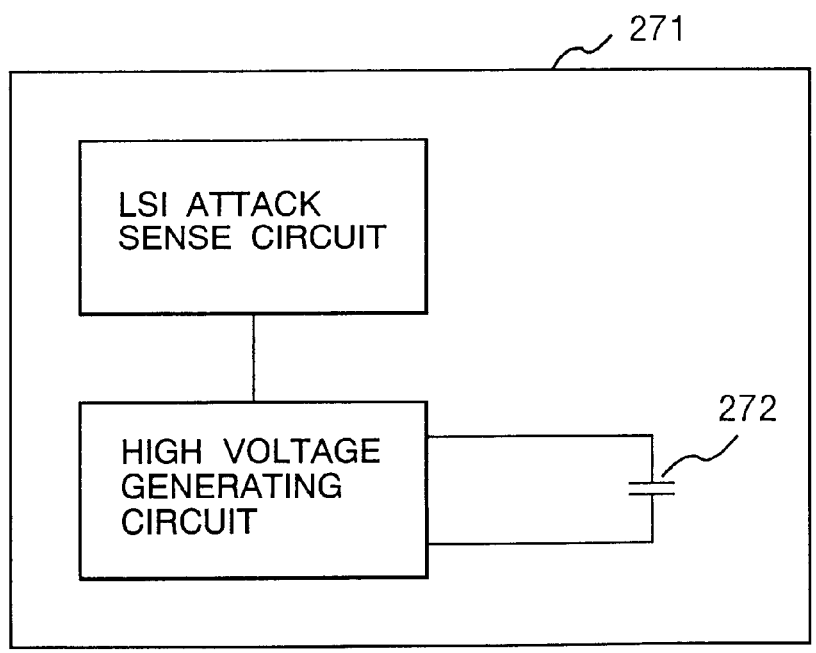
FIG. 19 is a drawing of a eighth embodiment of the present invention.

FIG. 19 shows the plane view of the IC chip on the IC card which is another embodiment of the present invention. The semiconductor chip 271 on the IC card has a capacitor 272 formed in accordance with said Embodiment 1. If a malicious third person try to probe the semiconductor chip 271 and attack the capacitor, its peripheral circuit, or the analog/digital converter to read the key code, the LSI attack sense circuit senses the probing and sends a signal to the high-voltage generating circuit.

The high-voltage generating circuit applies a voltage higher than the withstanding voltage across the capacitor 272. This high voltage makes a short-path in the electrodes or its vicinity and causes the metallic electrode ingredient to migrate.

Naturally, the regeneration of the capacitance becomes impossible and the key code cannot be read out. Thus, the IC card is protected against forgery and falsification.

Embodiment 9

Figure 20A:
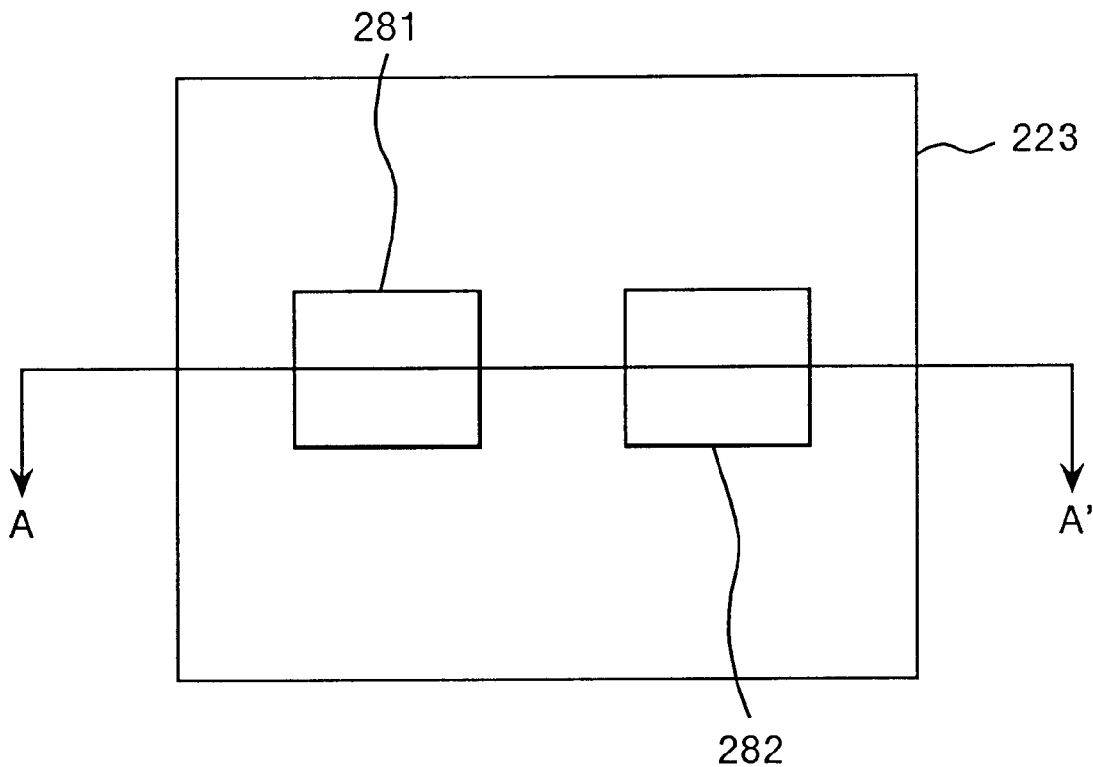
FIG. 20 shows plane and sectional views of a ninth embodiment of the present invention.
Figure 20B:
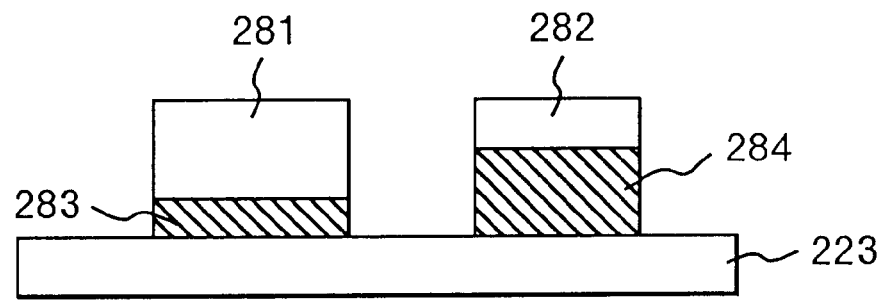

This embodiment has dielectric films of different thicknesses to form random capacitances. This embodiment will be explained referring to FIG. 20. FIG. 20(a) shows the plane view of this embodiment and FIG. 20(b) shows a sectional view taken along the line A–A' in FIG. 20(a). The first electrode 281 and the second electrode 282 are respectively faced to the third electrode 223. A dielectric film 283 placed between electrodes 281 and 223 is thinner than that 284 placed between electrodes 282 and 223.

As the dielectric films of different thicknesses have an identical dielectric constant, the capacitance between electrodes 281 and 223 is different from that between electrodes 282 and 223.

This embodiment created electrodes 281 and 282 having different random thicknesses by filing away the surfaces of the electrodes by laser. Consequently, the capacitances are randomly various.

Also in this embodiment, as far as capacitances are obtained, the electrodes 281, 282, and 223 can have any materials, shapes, and sizes.

The present invention enables presentation of economical methods to protect IC cards against forgery and falsification. This can be attained by giving one or more electrodes whose surfaces are rough (having irregular projections and dents) to both an IC chip and a card base, causing these electrodes to touch each other with the electrodes of the IC chip faced down, measuring the resistance of electrodes in connection, analog-to-digital converting the resistance, and using the result as the key code of the IC card. Usually the IC card can have a plurality of electrodes, which makes contact resistances randomly various and disables reproduction of key codes.

The capacitances can be made randomly various also by changing materials, thicknesses, and/or shapes of dielectric films placed between electrodes (between the IC chip and the card base) and A/D-converting the capacitances. The resulting key codes are random are dispersed and makes forgery and falsification the most difficult.

Further the capacitances of IC cards are very sensitive to violating attacks (disassembling, electrical probing, etc.) and easily destructed by them, which makes forgery and falsification the most difficult.

I claim:

1. A device comprising an IC chip equipped with a first electrode and a substrate equipped with a second electrode which is electrically connected face-to-face to said first electrode; wherein said device has a key code created on a basis of information obtained by analog-to-digital-converting a contact resistance between said first and second electrodes.

2. A device in accordance with claim 1, wherein said key code is created by encrypting said A/D-converted information and stored in a memory area of said IC chip.

3. A device in accordance with claim 2, wherein decoding of an open key code used to read said key code and a common key code used to write said key code in memory is performed by a host system which controls said read/write unit.

4. A device in accordance with claim 1, wherein said key code is created by performing a first encrypting process on said A/D-converted information in said IC chip and a second encrypting process outside an IC card which includes said IC chip and stored in a memory area in said IC chip.

5. A device in accordance with claim 1, wherein said key code is read by a read/write unit for an IC card which includes said IC chip and stored together with a ID code of said IC card in a database of a server connected to said read/write unit.

6. A device in accordance with claim 1, wherein said key code is used to protect an IC card which includes said IC chip against forgery and falsification.

7. A device in accordance with claim 1, wherein said key code is used for mutual certification between an IC card which includes said IC chip and a read/write unit which transfers information to and from said IC card.

8. A device in accordance with claim 1, wherein said key code is used together with a password code or biological characteristic code for identification of an owner of an IC card which includes said IC chip.

9. A device in accordance with claim 8, wherein said biological characteristic code is at least one of palm code, finger print code, smell code, face code, voice code, vein code, pupil code, and DNA code.

10. A device in accordance with claim 1, wherein said IC card is used for identification of a card owner, forgery inspection, and mutual certification between an IC card which includes said IC chip and a read/write unit when said IC card is used as electronic money.

11. A device in accordance with claim 1, wherein two to four resolution levels are used for said analog-to-digital conversion.

12. A device in accordance with claim 1, wherein a connection area between said first and second electrodes is 15 microns or smaller.

13. A device in accordance with claim 1, wherein the electrodes of said IC chip are arranged in a matrix.

14. A device in accordance with claim 1, wherein said key code is used to identify an IC card which includes said IC chip from other IC cards when they are used simultaneously.

15. A device in accordance with claim 1, wherein at least one of said first and second electrodes has irregular dents and projections on a surface of the device.

16. A device in accordance with claim 1, wherein each of said first and second electrodes consists of an array of a plurality of micro pads.

17. A device in accordance with claim 1, wherein analog values of said contact resistances are excluded in said analog-to-digital conversion.

18. A device comprising an IC chip equipped with a first electrode and a substrate equipped with a second electrode which is electrically connected face-to-face to said first electrode with electroconductive adhesive material therebetween; wherein said device has a key code created on a basis of information obtained by analog-to-digital-converting a contact resistance between said first and second electrodes.

19. A device comprising an IC chip equipped with a first electrode and a substrate equipped with a second electrode which is electrically connected face-to-face to said first electrode with anisotropic electroconductive adhesive material containing fine electroconductive particles therebetween; wherein said device has a key code created on a basis of information obtained by analog-to-digital-converting a contact resistance between said first and second electrodes.

20. A device in accordance with claim 19, wherein a main ingredient of said electroconductive particles is equal to that of said first and second electrodes.

21. A device comprising an IC chip equipped with a first electrode having irregular dents and projections on a surface of the device and a sheet-like substrate equipped with a second electrode which is electrically connected face-to-face to said first electrode; wherein said device has a key code created on a basis of information obtained by analog-to-digital-converting a contact resistance between said first and second electrodes.

22. An IC card comprising a card base and a device which are located face-to-face to each other and electrodes which are placed face-to-face at intervals on each of said card base and said device, wherein a capacitance between said electrodes is converted into a value and used as a key code.

23. An IC card in accordance with claim 22, wherein a semiconductor chip contains an amplifier which forms an integrating circuit together with a capacitor and a preset resistor which are connected to said amplifier and said capacitance is converted into a value by A/D converting a voltage value output from the integrating circuit.

24. An IC card in accordance with claim 22 or 23, wherein said card base and the semiconductor chip are respectively equipped with a plurality of isolated and opposed electrodes and the capacitances between said electrodes are randomly various.

25. An IC card in accordance with claim 24, wherein a dielectric film made of different kinds of dielectric materials is placed between said isolated and opposed electrodes.

26. An IC card in accordance with claim 24, wherein a dielectric film of an identical kind but of different thicknesses is placed between said isolated and opposed electrodes.

27. An IC card in accordance with claim 24, wherein said isolated and opposed electrodes are disposed at different intervals.

28. An IC card in accordance with claim 27, wherein said isolated and opposed electrodes are different in thickness.

29. An IC card in accordance with claim 24, wherein a granular material of an identical kind but of different diameters is placed between said isolated and opposed electrodes.

30. An IC card in accordance with any one of claims 22 through 29, wherein a dielectric film can be any one of $BaSrTiO_3$, PST, $CaTiO_3$, and $KH_2PO_4$ films.

31. A method of evaluating an IC card comprising a step of inquiring an IC card equipped with a device containing a name area and a key code of a name of an owner of the IC card, a step of transferring a response (an owner's name) from said IC card to a database, sending an open key code encrypted with a random number to said IC card, decoding encrypted information from said IC card, and comparing the response by said key code obtained from said database.

32. A method of evaluating an IC card in accordance with claim 31, wherein the key code of said IC card is stored in said database in advance.

* * * * *